(12) United States Patent
Stopler

(10) Patent No.: US 7,680,026 B2
(45) Date of Patent: Mar. 16, 2010

(54) METHOD AND APPARATUS FOR IMPROVING RECEPTION IN WIRELESS NETWORKS SUBJECTED TO NEIGHBORING CELLS' INTERFERENCES

(75) Inventor: Dan Stopler, Holon (IL)

(73) Assignee: Alvarion Ltd., Tel-Aviv (IL)

( * ) Notice: Subject to any disclaimer, the term of this patent is extended or adjusted under 35 U.S.C. 154(b) by 864 days.

(21) Appl. No.: 11/475,245

(22) Filed: Jun. 27, 2006

(65) Prior Publication Data

US 2007/0008873 A1 Jan. 11, 2007

(30) Foreign Application Priority Data

Jun. 27, 2005 (IL) .................................... 169417

(51) Int. Cl.
*H04J 11/00* (2006.01)
(52) U.S. Cl. ........................................ 370/203; 370/210
(58) Field of Classification Search ......... 370/200–253, 370/272–390, 431–546
See application file for complete search history.

(56) References Cited

FOREIGN PATENT DOCUMENTS

EP 1 667 341 A1 * 7/2001

* cited by examiner

*Primary Examiner*—Ricky Ngo
*Assistant Examiner*—Iqbal Zaidi
(74) *Attorney, Agent, or Firm*—Browdy and Neimark, PLLC

(57) ABSTRACT

A method is provided for estimating a signal received at a wireless cell along a channel where the frequency used for conveying traffic is substantially equal to frequency used for conveying traffic along at least one other channel extending from/to at least one substantially interfering cell. The method comprises: associating a pilot sequence with operative cells; providing a receiver with information to allow estimation of the pilot sequence by a respective transmitter; providing the receiver with information to allow estimation of pilot sequences associated with other transmitters communicating with other receivers located at the geographical proximity of that receiver; estimating the signal associated with the pilot sequence used by the first transmitter; subtracting the estimated signal from an input signal received by that receiver; estimating the pilot signal associated with a pilot sequence used by other transmitters; and modifying the estimation of the pilot signal used by the first transmitter.

9 Claims, 2 Drawing Sheets

METHOD AND APPARATUS FOR IMPROVING RECEPTION IN WIRELESS NETWORKS SUBJECTED TO NEIGHBORING CELLS' INTERFERENCES

FIELD OF THE INVENTION

The present invention relates to transmitting and receiving signals in wireless communications systems, and more particularly to signals transmitted in wireless networks such as orthogonal frequency division multiplexing ("OFDM") based networks.

BACKGROUND OF THE INVENTION

The growing demand for wireless communications is constantly increasing the requirement for enhancing the capacity of service available to the users. One of the solutions known in the art to increase the capacity of a given wireless network is the reuse of available frequencies. An example of such method of operation is the Reuse-1 by which the same range of frequencies is used at each of the system's cells (as opposed to a solution whereby the same range of frequencies is used per a number of cells in order to avoid overlapping between adjacent cells). The advantage of using the Reuse-1 method is that the frequency range used in each of the cells can be considerably wider than that used in other types of reuse methods, while the obvious problem is how to prevent interferences between the adjacent cells.

One way of handling the overlapping problem is by using symbol repetition (i.e. transmitting each symbol more than once, say two-three times). All symbols together with their replications are received and stored at the receiving end and the decision on what should have been received is more robust as the addition of the data signals will be coherent while addition of the noise bits will not have that property.

Still, this solution does not solve another problem associated with this method, namely the channel estimation. Accurate channel estimation is required for demodulation and in particular for effective combining of the low signal to interference and noise ratio (hereinafter "SINR") repeated symbols. The procedure of carrying out channel estimation is based upon pilot symbols being transmitted along with the data symbols and received at the receiving end, but the problem here is that the pilot symbols interfere with adjacent cell's pilot symbols. In CDMA type of communication systems (e.g. IS-95) this problem is solved by increasing the pilot power and using pseudorandom spreading of the pilot signals. However, in OFDMA type of communication systems this type of solution is not applicable to solve the problem, since pilot tones in the desired cell and in the interfering cells coincide. Increasing the pilot power causes increase also in the interference level from the pilots in adjacent cells, leaving the pilot SINR unchanged. For this reason, channel estimation algorithms assuming that the signal is accompanied by regular thermal noise will have a highly degraded performance.

EP 1,276,251 discloses a method for calculating a weighting vector for an antenna array whereby in order to increase the carrier to interference+noise ratio ("CINR") a method is provided to calculate a weighing vector to support interference cancellation in an Orthogonal Frequency Division Multiplexing (OFDM) multi-carrier modulation technique. By the solution described in this publication, when there are two or more interferences with known interference channel vectors, the antenna weighing vectors is selected from among the orthogonal complement of all interference channel vectors, after carrying out orthogonalization procedure upon the respective interference channel vectors.

The above reference mentioned is hereby incorporated by reference as if fully set forth herein.

SUMMARY OF THE INVENTION

It is an object of the present invention to provide a method and apparatus that allow improving the quality of transmission in a wireless network.

It is another object of the present invention to provide a method and device to enable improved operation of adjacent cells using substantially the same range of frequencies for transmissions.

It is another object of the present invention to provide a method and device which allow improved operation of non-adjacent cells using substantially the same range of frequencies and being considerable interference sources to each other (i.e. when working in a lower reuse than Reuse-1 e.g. Reuse-3). It is yet another object of the present invention to provide a method and apparatus for increasing the signal to interference+noise ratio ("SINR"). Other objects of the invention will become apparent as the description of the invention proceeds.

In accordance with a first aspect of the present invention, there is provided a method for estimating a signal received along a first communication channel in a wireless network that comprises a plurality of wireless communication cells and a plurality of communication channels extending therebetween, wherein the transmission/reception frequency used for conveying traffic along that at least one channel is substantially equal to the transmission/reception frequency used for conveying traffic along at least one other communication channel extending from/to at least one considerably interfering cell (either adjacent to the cell from/to which that first communication channel extends, or not), which method comprising:

(i) associating a pilot sequence with each one of the plurality of wireless communication cells;

(ii) providing at least one receiver (either of a base station or of a subscriber) with information related to the operation of a first transmitter with which the at least one receiver is adapted to communicate and wherein that information comprises information that would allow estimation of the pilot sequence used by that first transmitter;

(iii) providing that at least one receiver with information related to the operation of other transmitters that are operative to communicate with one or more receivers located at the geographical proximity of that at least one receiver, which information comprises information that would allow estimation of the pilot sequences associated with these other transmitters;

(iv) estimating the signal associated with the pilot sequence used by the first transmitter, e.g. by means of correlation;

(v) subtracting the estimated signal from an input signal received by that at least one receiver;

(vi) estimating the pilot signal associated with a pilot sequence used by at least one of the other transmitters based on the difference obtained in step (v);

(vii) carrying out a modified estimation of the pilot signal used by the first transmitter, based on canceling the estimated result of step (vi) from the input of step (iv) and multiplying the resulting difference by the pilot sequence associated with the first transmitter.

The term "pilot sequence" referred to hereinabove, encompasses both location and phase type of pilot sequences associated with each one of the plurality of wireless communication cells. The pilot location sequence is a sequence of pilot signals that may be reused by the various cells, while the pilot phase sequences are sequences of pilot signals used by the different cells that are pseudorandom (but not necessarily orthogonal) with respect to each other.

It should be understood by those skilled in the art that the estimations referred to in steps (iv) and (vi) above, may either be carried either separately by an iterative process or together, and both methods are encompassed by the present invention.

According to another embodiment of the invention, the method provided further comprises the following steps:
(a) subtracting the modified estimation of the pilot signal used by the first transmitter from the input signal;
(b) estimating a second signal associated with the pilot sequence used by a second transmitter;
(c) subtracting the estimated second signal from the difference obtained in step (a);
(d) estimating the pilot signal associated with a pilot sequence used by at least one of the remaining transmitters based on the difference obtained in step (c);
(e) determining a modified estimation of the pilot signal from the second transmitter, based on canceling the estimated result of step (d) from the input of step (b) and multiplying the resulting difference by the pilot sequence associated with the second transmitter to obtain a modified estimation of the pilot signal used by the second transmitter at the at least one receiver;
(f) repeating steps (a) to (e), mutates mutandis, to obtain modified estimations of the desired and interfering pilot signals received at that receiver.

By this embodiment of the invention, both the modified estimation of the pilot signal transmitted along the desired channel and of the pilot signals transmitted along the interfering channels, allowing an improved processing of the desired signals.

As will be appreciated by those skilled in the art, to obtain the estimation of the signal transmitted along the n-th communication channel, where n is an integer equal to or greater than 3, the step of subtracting the modified estimated signal from the input received, comprises subtracting the sum of the modified estimated signals of all (n-1)-th communication channels.

According to another embodiment of the invention, modified estimations of signals transmitted along both the desired and the interfering channels are simultaneously carried at the receiver. This is possible because as the pilot sequences are provided at the receiver, the mathematical problem to solve to obtain the modified estimates is a linear problem.

The modified estimates obtained for signals transmitted along the desired channel as well as for signals transmitted along the interfering channels, by either one of the embodiments described herein, may be used as a starting point of an iterative estimation procedure carried out for the next symbol, or for the next frame. Consequently, the method of the present invention also enables tracking of a fast changing channel.

By another embodiment of the invention, the modified estimates of both the desired and the interfering channels are useful for a demodulation process. The former is used for channel equalization, while the latter may be used for estimating symbol SINR thus allowing effective maximal ratio combining.

According to yet another embodiment of the invention, if a receiver is associated with a multiple antennas, the interfering channel estimation may be used for interference nulling (i.e. phasing the antennas array in such a way so as to null the different interferences) or Minimum Variance Distortionless Response (or other known beam forming techniques, e.g. Minimum Mean Square Error), preferably by providing each of the pilot sequences received with a corresponding weight factor, and applying these weight factor while carrying out the processes described above.

By yet another aspect of the present invention, there is provided a receiver (e.g. located at a base station or at a subscriber terminal) adapted to receive communications conveyed along at least one communication channel extending in a wireless network which comprises a plurality of wireless communication cells and a plurality of communication channels extending therebetween, wherein the transmission/reception frequency used for conveying traffic along that at least one channel is substantially equal to the transmission/reception frequency used for conveying traffic along at least one other communication channel extending from/to at least one considerably interfering cell, wherein said receiver comprising:
an interface operative to receive wireless communications along said at least one communication channel and at least one pre-defined pilot sequence of signals associated with that at least one communication channel;
at least one processing means comprising:
a database adapted to store
(a) information related to the operation of at least one transmitter operative to transmit communications towards the receiver along that at least one channel, wherein that information comprises information that would allow reconstruction of the at least one pre-defined pilot sequence of signals associated with the at least one channel; and/or
(b) information related to the operation of other transmitters, that are operative to communicate with one or more other receivers which would allow reconstruction of the pilot sequences used by these other transmitters; and
a processor adapted to:
(a) retrieve at least one pre-defined pilot sequence of- signals associated with that at least one communication channel and comprised in communication transmissions received;
(b) carry out an estimation of that at least one pre-defined pilot sequence of signals and canceling it from the input to step (c).
(c) carry out an estimation of a signal associated with at least one other pilot sequence;
(d) modify the estimation of the at least one pre-defined pilot sequence used by the first transmitter, based on canceling the estimated result of the signal associated with the at least one other pilot sequence from the estimated result carried of that at least one pre-defined pilot sequence of signals; and
(e) applying the resulting modified estimation to the pilot signals received along the corresponding at least one communication channel to obtain an updated modified estimation of said pilot signals received along that at least one communication channel.

According to another aspect of the invention, there is provided a mobile wireless receiver adapted to receive communications conveyed along at least one communication channel extending in a wireless network which comprises a plurality of wireless communication cells and a plurality of communication channels extending therebetween, wherein the transmission/reception frequency used for conveying traffic along that at least one channel is substantially equal to the transmission/reception frequency used for conveying traffic along at least one other communication channel extending from/to at least one considerably interfering cell, wherein said receiver comprising:

an interface operative to receive wireless communications along the at least one communication channel and at least one pre-defined pilot sequence of signals associated with that at least one communication channel;

at least one processor adapted to:
(1) retrieve information related to the operation of at least two different transmitters operative to transmit communications to a location in which the mobile wireless receiver is currently located, wherein that information comprises information that would allow reconstruction of the at least one pre-defined pilot sequence of signals associated with said at least one channel;
(2) carry out an estimation of that at least one pre-defined pilot sequence of signals;
(3) carry out an estimation of a signal associated with the other pilot sequences;
(4) modify said estimation of the at least one pre-defined pilot sequence used by one of said at least two transmitters, based on canceling the estimated result of the signals associated with each of the other pilot sequence from the estimated result carried out of that at least one pre-defined pilot sequence of signals; and
(5) applying the resulting modified estimation to the pilot signals received along the corresponding at least one communication channel to obtain an updated modified estimation of pilot signals received along that at least one communication channel.

DETAILED DESCRIPTION OF THE INVENTION

Figure 1:
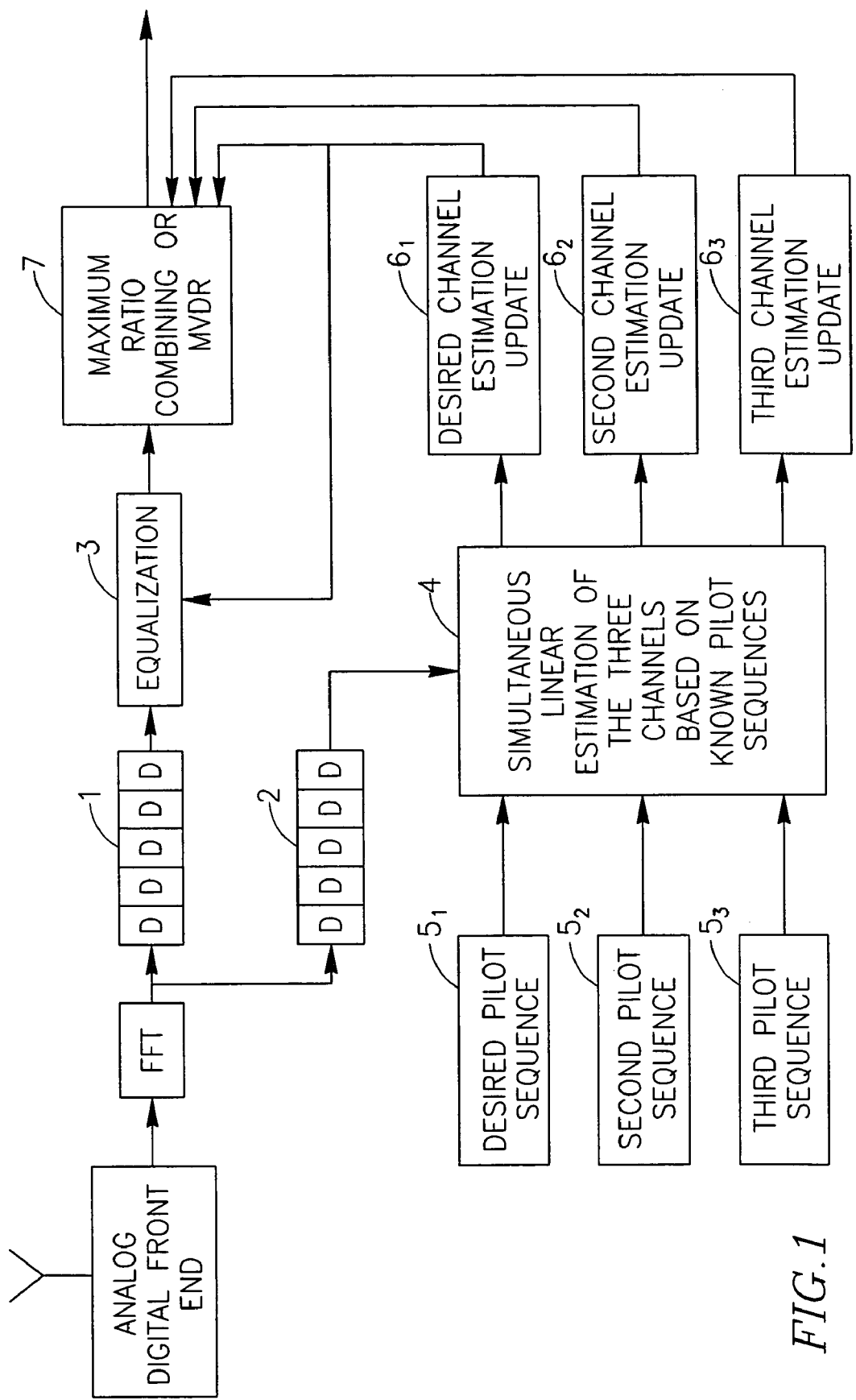
FIG. 1—presents a schematic illustration of a simultaneous channel estimation carried out in accordance with an embodiment of the present invention.

A better understanding of the present invention is obtained when the following non-limiting detailed description is considered in conjunction with the following drawings in which:

FIG. 1 describes an example of an embodiment of the present invention for carrying out a simultaneous channel estimation of both desired and interfering sub-channels. The simultaneous estimation is based on the known pilot sequences. By the present example, the received signal vector r is a sum of all pilot sequences $p_k$ multiplied (or convolved) by their corresponding amplitude $\alpha_k$ and their channels $c_k$. This example is used to describe a case of OFDM where the channel is simply a scalar depending on the transmitter k and the tone we are processing. Given the pilot sequences and the received signal, we are faced with a linear problem:

$$r = \sum_k a_k \cdot c_k \cdot p_k + n.$$

Although this linear problem is demonstrated in an OFDM system where the channel is a scalar, still, similar processing is also possible in single carrier line codes. For example, for OFDM: if we have only one interferer in addition to our desired channel, thus k=1,2. In this latter case we would need to estimate only two parameters, i.e. the products $a_k \cdot c_k$ for k=1,2 and there will be no need to estimate $a_k$ and $c_k$ separately. Let us assume that the number of samples we have is N=10 (i.e. the length of the vector r and $p_k$) and each of the channels $c_k$ is assumed to be constant over time, then we would have a linear problem with 2 unknowns and 10 equations, which is easily solvable in the least square sense. If on the other hand the channel is Rayleigh fading with fading autocorrelation being jakes or sinc, the method can also be used.

A scheme that provides both a simulated model and a canceling scheme is demonstrated in the following example.

```
% Nsigma determines SNR
Nsigma=10^(-10/20)/sqrt(2);
% Npilots=2 => 1 desired pilot and one interfering pilot
Npilots=2;
% 1000 simulations
nt=1000;
% 10 samples received per one estimation
L=10;
% Fading doppler frequency
FDopp=216; %216
% Sampling rate per OFDM tone is 10KHz here
Fs=10e3
% Ratio of interference to signal gain
gI2S=1;
% Estimated ratio of interference to signal gain
gI2Sest=1;
% Sinc fading autocorrelation
jcorr=sinc(2*FDopp*[0:L-1]/Fs);
% Use SVD both for simulation and for estimation
Raa=toeplitz(jcorr);
[V,D]=eig(Raa);
V=V*sqrt(D);
err_a=zeros(Npilots,L);
for tt=1:nt
% Generate random pilot sequences
p=(sign(randn(L,Npilots))+j*sign(randn(L,Npilots)))/sqrt(2);
p(:,2:Npilots)=p(:,2:Npilots)*gI2S;
% Generate random channels with autocorrelation by jcorr
a=(V*(randn(L,Npilots)+j*randn(L,Npilots))/sqrt(2));
% Sum pilots convolved with channels and noise
% to obtain received signal
y=sum(((p.*a).')).';
y=y+Nsigma*(randn(size(y))+j*randn(size(y)));
% Buid matrix describing trasmitted pilots, and channel
% autocorrelations. Matrix is used for MAP estimation
% of both channels
% y=p*a => p'*y=p'*p*a
% y=[ diag(p1)*V; diag(p2)*V; Id ]*n = U*S*V'*n
Mat=[diag(p(:,1))*V gI2Sest*diag(p(:,2))*V
Nsigma*sqrt(2)*eye(L)];
% Invert matrix to obtain result.
x=pinv(Mat)*y;
x=V*[x(1:L) x(L+1:2*L)];
err_a(:,tt)=mean(abs(a-x).^2)';
end;
% Display resulting channel estimation error in dBc
10*log10((mean(err_a')))
```

The simulation shows a scenario of a typical mobile operative at a carrier of 2.4 GHz. It is shown that for the 216 Hz Doppler with 10 KHz sampling and SNR=10 dB (no interferer =>gI2S=gI2Sest=0) we would get −17.5 dBc (since L=10 with no Doppler effect, we expect −20 dBc). Then adding one interferer with S/I=0 dB without using the scheme presented for this embodiment of the invention, we would get −7.5 dBc, or in other words, a 10 dB reduction in performance. In contrast, applying invention (gI2S=gI2Sest=1) would allow us to get about −16 dBc, or in other words, we would lose 1.5 dB instead of 10 dB with respect to the ideal case of no interference at all.

FIG. 1 demonstrates a process of simultaneous channel estimation in accordance with the present invention, while applying any suitable array processing technique that is known in the art per se, such as the MVDR ("Minimum Variance Distortionless Response") referred to in FIG. 1, in which if C is the desired direction and Rs+i,s+i is the covariance of signal+interference, then MVDR weights are inv(Rs+i,s+i)*C. As shown in this FIG. 1, the output of the data delay lines 1 is forwarded to equalization block 3, while the output of the pilot delay lines 2 to estimator 4 where together with the pilot signals of the desired channel ($5_1$) and the other pilot sequences $5_2$ and $5_3$, allow producing the respective estimation updates, $6_1$ to $6_3$. The updates are forwarded to equalization block 3 and the latter output is forwarded to block 7 where maximum ratio combing or MVDR is applied thereon. The result of the operation of block 7 is the equalized symbols after suppressing the interferences.

Figure 2:
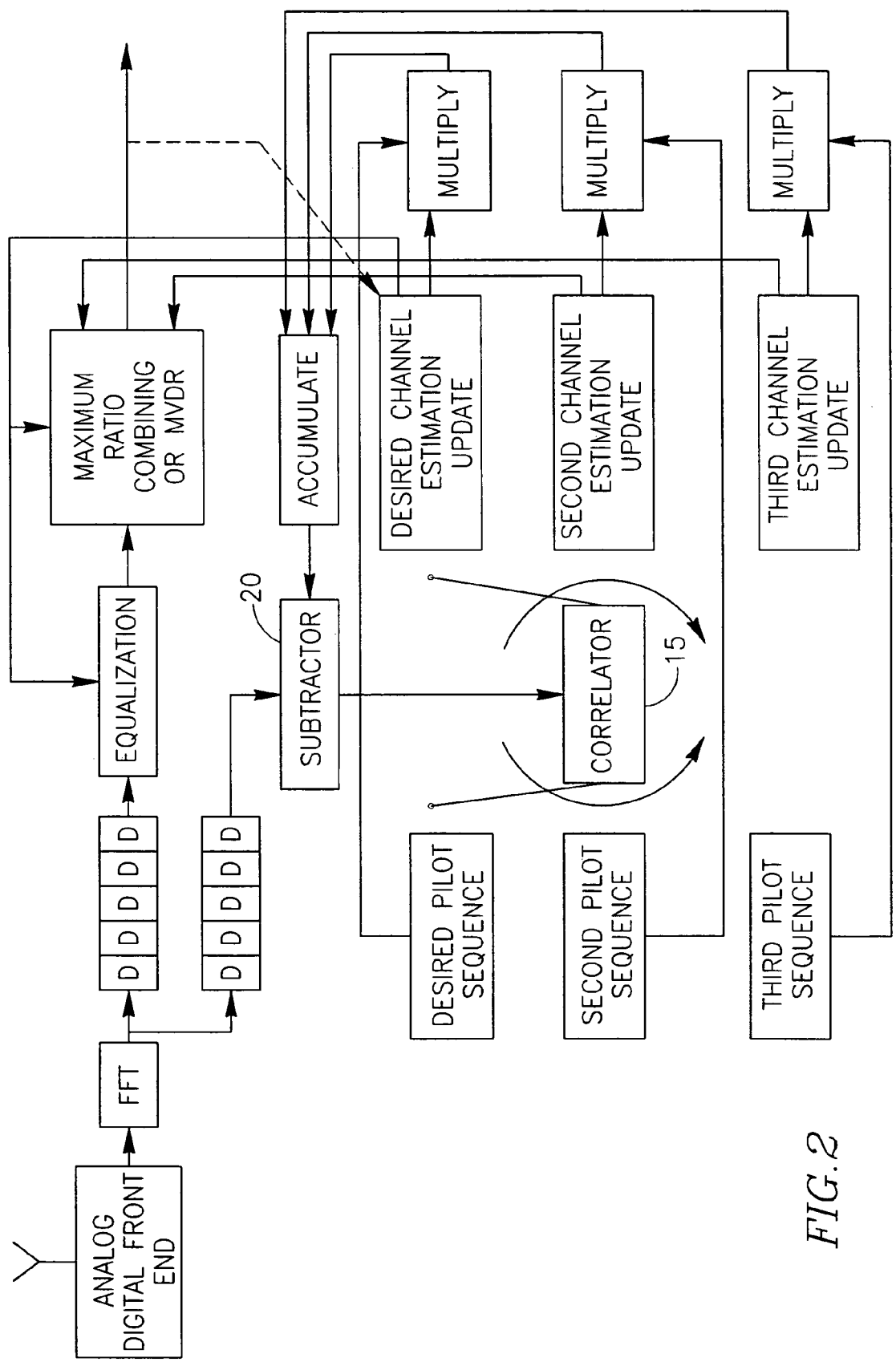
FIG. 2—demonstrates an example of a method for carrying out iterative channel estimation in accordance with an embodiment of the present invention.

FIG. 2 describes an iterative technique suggested in the example provided above for channel estimation. By this example, the receiver first estimates one channel (say the channel of the first, desired signal—by switching correlator 15 input and output correspondingly), then multiplies the resulting channel's signal by the pilot sequence to obtain an estimation of the first signal. This first signal is then subtracted from the input signal by subtractor 20. The remaining signal contains mainly the other signals, e.g. the second and third signals (and so on). Now the receiver estimates one of the remaining channels, say the channel of the second signal by switching correlator 15 input and output correspondingly and multiplying the result by the pilot sequence of the second signal to obtain an estimation of the second signal. Then the sum of the estimated first and second signals is subtracted from the input signal by subtractor 20, and the third signal is estimated from the subtraction result by switching correlator 15 accordingly. This process continues, preferably while increasing the gain used for the channel estimation update during the iterative process, until the remaining signals (after subtracting the first, second, third . . . and so on signals) are too weak to estimate. Subsequently the process is repeated estimating the first signal after subtracting all other estimations (second, third, fourth . . . and so on) from the input signal, while the signals are generated using the known pilot sequences multiplied by channel estimations accumulated together and subtracted from the received signal by subtractor 20. Then estimating the second signal after subtracting all other estimations (first, third, fourth . . . ) from the input signal. Similarly the third signal is estimated, and then the fourth signal is estimated and so on. This iterative process may be repeated until the estimations converge. The result is estimation for each of the pilot signals received from the different transmitters, the desired transmitter and the interfering ones.

As will be appreciated by those skilled in the art, although the present invention was described herein for use in OFDMA type of communication systems, it can also be implemented in other types of communication systems such as CDMA etc. to provide improved performance of channel estimation.

It is to be understood that the above description only includes some embodiments of the invention and serves for its illustration. Numerous other ways of improving the estimation of pilot sequences in telecommunication networks may be devised by a person skilled in the art without departing from the scope of the invention, and are thus encompassed by the present invention.

The invention claimed is:

1. A method for use in a wireless network comprising a plurality of wireless communication cells and a plurality of communication channels extending therebetween, for estimating a signal received at a first wireless communication cell selected from among said plurality of wireless communication cells after being transmitted along a first communication channel, wherein transmission/reception frequency used for conveying traffic along said first communication channel is substantially equal to transmission/reception frequency used for conveying traffic along at least one other communication channel extending from/to at least one considerably interfering cell, which method comprising:

associating a pilot sequence with each one of the plurality of wireless communication cells;

(ii) providing at least one receiver with information related to the operation of a first transmitter with which the at least one receiver communicates and wherein that information comprises information that would allow estimation of the pilot sequence used by that first transmitter;

(iii) providing that at least one receiver with information related to the operation of other transmitters that are operative to communicate with one or more receivers located at the geographical proximity of that at least one receiver, which information comprises information that would allow estimation of the pilot sequences associated with these other transmitters;

(iv) estimating the signal associated with the pilot sequence used by the first transmitter;

(v) subtracting the estimated signal from an input signal received by that at least one receiver (vi) estimating the pilot signal associated with a pilot sequence used by at least one of the other transmitters based on the difference obtained in step (v); and (vii) carrying out a modified estimation of the pilot signal used by the first transmitter, based on canceling the estimated result of step (vi) from the input of step (iv) and multiplying the resulting difference by the pilot sequence associated with the first transmitter.

2. The method according to claim 1, wherein the pilot location sequence of at least one of said pilot sequences associated with one other of the plurality of wireless communication cells, overlaps with the pilot location sequence of the pilot sequence used by said first transmitter.

3. The method according to claim 1, further comprising the following steps:

subtracting the modified estimation of said pilot sequence used by said first transmitter from the input signal;

(b) estimating a second signal associated with a pilot sequence used by a second transmitter;

(c) subtracting the estimated second signal from the difference obtained in step (a);

(d) estimating the pilot signal associated with a pilot sequence used by at least one of the remaining transmitters based on the difference obtained in step (c);

(e) carrying out a modified estimation of the pilot signal used by the second transmitter, based on canceling the estimated result of step (d) from the input of step (b) and multiplying the resulting difference by the pilot sequence associated with the second transmitter to obtain a modified estimation of the pilot signal used by the second transmitter at the at least one receiver;

(f) repeating steps (a) to (e), mutates mutandis, to obtain modified estimations of the desired and interfering pilot signals received at said receiver.

4. The method according to claim 1, wherein the steps of obtaining said modified estimation of signals transmitted along said first communication channel and along at least one of the other communication channels are carried simultaneously.

5. The method according to claim 1, wherein said modified estimations obtained for signals transmitted along said first communication channel and along at least one of the other communication channels, are used as a starting point of an iterative estimation procedure carried out for the next symbol, or for the next frame.

6. The method according to claim 1, wherein said modified estimates obtained for signals transmitted along said first communication channel and along at least one of the other communication channels, are used in a demodulation process.

7. The method according to claim 1, wherein at least one of said at least one receiver is associated with an array of multiple antennas, and wherein said method is applied in a process of estimating signals received by said multiple antennas so as to essentially null interferences to signals received along said first communication channel, wherein said interferences result from signals conveyed along other communication channels.

8. A wireless receiver for receiving communications conveyed along at least one communication channel extending in a wireless network which comprises a plurality of wireless communication cells and a plurality of communication channels extending therebetween, wherein the transmission/reception range of frequencies used for conveying traffic along that at least one channel is substantially the same range of transmission/reception frequencies used for conveying traffic along at least one other communication channel extending from/to at least one considerably interfering cell, wherein said receiver comprising:
- an interface operative to receive wireless communications along said at least one communication channel and at least one pre-defined pilot sequence of signals associated with that at least one communication channel;
- at least one processing means comprising:
- a database for storing
  - (a) information related to the operation of at least one transmitter operative to transmit communications towards the receiver along that at least one channel, wherein that information comprises information that would allow reconstruction of the at least one pre-defined pilot sequence of signals associated with the at least one channel; and/or
  - (b) information related to the operation of other transmitters that are operative to communicate with one or more other receivers which would allow reconstruction of the pilot sequences used by these other transmitters; and
- a processor for:
  - (1) retrieving that at least one pre-defined pilot sequence of signals associated with that at least one communication channel and comprised in communication transmissions received;
  - (2) carrying out an estimation of that at least one pre-defined pilot sequence of signals;
  - (3) Carrying out an estimation of a signal associated with at least one other pilot sequence;
  - (4) modifying said estimation of the at least one pre-defined pilot sequence used by said first transmitter, based on canceling the estimated result of the signal associated with said at least one other pilot sequence from the estimated result carried of said at least one pre-defined pilot sequence of signals; and
  - (5) applying the resulting modified estimation to pilot signals received along the corresponding at least one communication channel to obtain an updated modified estimation of said pilot signals.

9. A mobile wireless receiver for receiving communications conveyed along at least one communication channel extending in a wireless network which comprises a plurality of wireless communication cells and a plurality of communication channels extending therebetween, wherein the transmission/reception range of frequencies used for conveying traffic along that at least one channel is substantially the same range of transmission/reception frequencies used for conveying traffic along at least one other communication channel extending from/to at least one considerably interfering cell, wherein said receiver comprising:
- an interface operative to receive wireless communications along said at least one communication channel and at least one pre-defined pilot sequence of signals associated with that at least one communication channel;
- at least one processor for:
  - (1) retrieving information related to the operation of at least two different transmitters operative to transmit communications to a location in which said mobile wireless receiver is currently located, wherein that information comprises information that would allow reconstruction of the at least one pre-defined pilot sequence of signals associated with said at least one channel;
  - (2) carrying out an estimation of that at least one pre-defined pilot sequence of signals;
  - (3) carrying out an estimation of a signal associated with the other pilot sequences;
  - (4) modifying said estimation of the at least one pre-defined pilot sequence used by one of said at least two transmitters, based on canceling the estimated result of the signals associated with each of the other pilot sequence from the estimated result carried of that at least one pre-defined pilot sequence of signals; and
  - (5) applying the resulting modified estimation to the pilot signals received along the corresponding at least one communication channel to obtain an updated modified estimation of pilot signals received along that at least one communication channel.

* * * * *